SCALE ASSEMBLY WITH DIAL PLATE POSITIONED BY WAVE BAND SWITCH

Filed March 11, 1948

INVENTORS
MAX LEEUWIN &
JOHANNES C.A. RECOURT
BY
E. F. Wenderoth
ATTORNEY

Patented May 15, 1951

2,553,053

UNITED STATES PATENT OFFICE 2,553,053

SCALE ASSEMBLY WITH DIAL PLATE POSITIONED BY WAVE BAND SWITCH

Max Leeuwin and Johannes Christoffel Antonie Recourt, Eindhoven, Netherlands, assignors to Hartford National Bank and Trust Company, Hartford, Conn., as trustee Application March 11, 1948, Serial No. 14,276
In the Netherlands April 22, 1947

5 Claims. (Cl. 250—40)

Figures 1, 2:
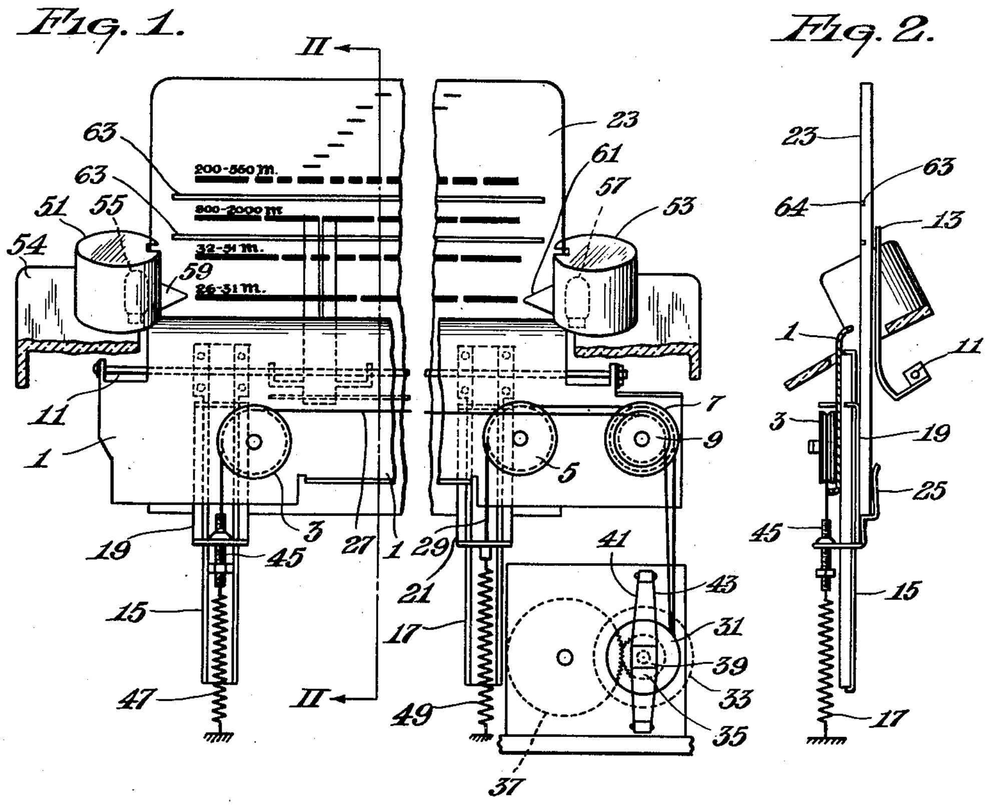

The invention relates to an electric apparatus, more particularly a radio receiver, housed in a cabinet and provided with a "separate" dial plate, that is to say a single dial plate which projects from the outer side of the cabinet and relatively to which a pointer is adapted to move.

In this construction use is made of a glass dial plate printed with station names and wavelength scales but otherwise transparent, which is adapted to be inserted into a slot in the top wall of the cabinet and is held tightly therein by means of spring-clamps. In transport the dial plate is detached from the apparatus.

Apart from their simple construction such dials, arranged externally of the cabinet, have the advantage that there is no need to reserve space for the dial plate at the front of the cabinet, so that there is great liberty for the constructor of the cabinet to make efficient use of the space at the front. The transparency and the arrangement on top of the cabinet ensure the advantage that the dial plate may be comparatively large without giving the impression of the apparatus being higher, which would be less agreeable from the point of view of appearance.

However, particularly with transparent dials, there is a difficulty in indicating which of the horizontal dial bands (wavebands) present on the dial plate is in use at a given moment. For this purpose use may be made of a pointer which is coupled with the waveband switch and adapted to move relatively to the side of the dial plate, an extension of the pointer by which it is actuated extending into the cabinet. Such a pointer is, however very vulnerable to damage and greatly detracts from the appearance of the apparatus.

The invention solves this problem in a different manner, the dial plate being adapted to be introduced into the cabinet to a greater or lesser depth through a slot in a wall, preferably, the top wall, this being effected by the dial plate, which is provided with several horizontal scales for the various wavebands, being adapted to be moved through a slot in a cabinet wall into and out of the cabinet by means of the waveband switch, with which the dial plate is mechanically coupled such that in each position of the switch the dial band just visible outside the cabinet corresponds to the particular position of the waveband switch. Reading of the dial is very simple; we know that we need look at the lowest dial band only, so that a pointer for band indication can be dispensed with.

Arrangement of the dial illumination lamps in elevations of the cabinet on either side of the dial plate ensures that the lamps are always positioned on either side immediately adjacent the dial band in use, so that primarily this band alone is illuminated. This effect may be accentuated by providing horizontal grooves between each pair of bands to retain the light and illumination to one band only.

A further advantage is offered by the possibility of an arrangement such that in the position "out" of the waveband switch, in which the apparatus is switched off, the dial is adapted to disappear completely in the cabinet so as to be protected from damage.

In order that the invention may be more clearly understood and readily carried into effect, it will now be described more fully with reference to the accompanying drawing, which shows, by way of example, one form of dial construction which forms part of a radio receiver according to the invention.

Figure 1A:
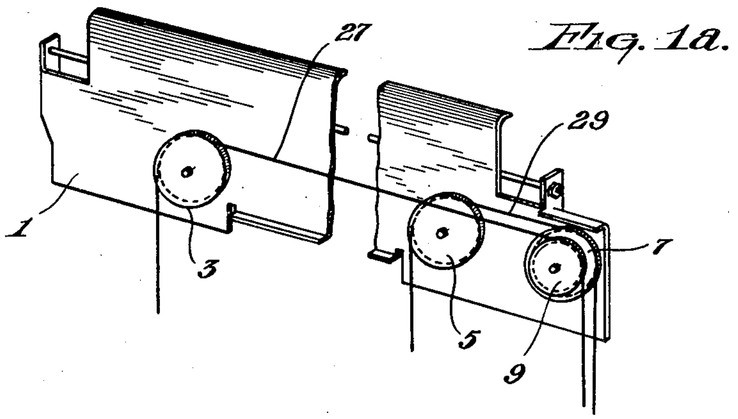

Fig. 1 is a front view at right angles to the dial plate which, in reality slightly tilts back, the cabinet wall being largely broken away, whereas Fig. 1*a* is a perspective view of the plate shown in Fig. 1 to more clearly show the arrangement of the pulleys mounted thereon, and Fig. 2 is a sectional view taken on the line II—II of Fig. 1.

The base of the dial plate is formed by a metal supporting plate 1, which is secured in a suitable manner, for example, by screws or brackets, to the cabinet of the apparatus. The plate 1 supports a plurality of pulleys 3, 5, 7 and 9, which are free to rotate, a horizontal guide rod 11 for the dial pointer 13 and two vertical trough-like guides 15 and 17 near the ends of the dial. The pulleys 7 and 9 are shown of different diameter to more clearly illustrate the relationship therebetween in Figure 1. Of course, it is to be understood that the aforesaid pulleys may preferably be of the same diameter. The parts 3, 5, 7, 9, 11, 13, 15 and 17 are all located inside the cabinet of the apparatus. Slides 19 and 21 are adapted to move on guides 15 and 17 respectively, and have secured to them a transparent detachable dial plate 23 of transparent synthetic resin, for example. Fig. 2 shows a clamping spring 25, by which the dial plate is clamped against the slide 19 near its left-hand end.

Secured to the slides 15 and 17 are the ends of ropes 27 and 29 respectively, which pass over the pulleys 3, 9 and 5, 7 respectively and then vertically downwards to a rope drum 31 common to the two ropes and seated, together with a control knob 33 of the waveband switch on a single spindle with which it is rigidly coupled. The waveband switch itself (not shown) is coupled, by means of a delaying gear wheel transmission 35, 37, with the control spindle. This spindle comprises a square part 39 engaged by two blade springs 41 and 43, so that four clicking positions per revolution are provided.

It may be seen from Figure 1 that on turning the control knob 33 the dial plate 23 rises or drops. The arrangement is such that the lowest dial band still visible on the dial plate 23—that is to say not covered by plate 1— always corresponds to the instantaneous position of the waveband switch, a clear indication of the adjusted waveband thus being provided.

In order to make provision for the position of the upper and lower edges of the dial plate 23 to be invariably horizontal the effective length of the rope 27 is controllable by means of a hollow screw bolt 45, to the lower end of which the rope is secured.

In order to keep the ropes 27 and 29 constantly taut, even if the dial plate is detached, provision is made of two springs 47 and 49, the upper ends of which are secured to the ropes, the lower ends to the cabinet of the apparatus.

The dial plate is illuminated in known manner by laterally incident light; for this purpose two dial illumination lamps 55 and 57 are housed in two box-like elevations 51 and 53 of the top wall 54 of the cabinet of the apparatus, which slightly grip the lateral edges of the dial plate. In the case illustrated part of the light of each of these lamps falls into a glass pointer 59 and 61 respectively, which is thus illuminated. This provides an additional distinct indication of the waveband and an attractive aesthetic effect.

As may be seen from Fig. 1, the light of the lamps 55 and 57 falls primarily into the dial portion which comprises the band to be indicated. This effect may be further accentuated by providing light-reflecting means in the dial plate between each pair of dial bands. Thus, for example, provision may be made at the rear of the dial plate of horizontal, narrow grooves 63 of slightly smaller depth than the thickness of the plate in which, say, polished metal strips 64 are inserted, the light being thus practically restricted to the dial band in use.

The vertical length of the pointer 13 is smaller than the height of the dial when completely moved out; it is sufficient for the visible pointer length to be equal to the largest (highest) dial band, which is preferably arranged at the top of the dial plate (in Fig. 1 the medium waveband).

Instead of being flat, the dial plate may be slightly curved about a horizontal axis.

The construction described is particularly advantageous if the dial plate is provided with a comparatively large number of dial bands, such, for example, as in the case of wireless receiving sets with bandspread facilities.

What we claim is:

1. Electrical apparatus tunable through a plurality of wave bands, comprising a cabinet portion provided with an opening, a dial plate having a plurality of scales arranged in horizontal relationship one above the other and each indicating one of said wave bands, an indexing member arranged at the outside of said cabinet portion in fixed relationship to said opening, wave band switching means for adjusting said apparatus to a desired wave band, and means to processively move said dial plate through said opening to thereby successively position said scales adjacent to said indexing member comprising a dial plate actuating member coupled to said wave band switching means and to said dial plate.

2. Electrical apparatus tunable through a plurality of wave bands, comprising a cabinet portion provided with a slot, a dial plate having a plurality of scales arranged in horizontal relationship one above the other and each indicating one of said wave bands, an indexing member arranged at the outside of said cabinet portion in fixed relationship to said slot, wave band switching means for adjusting said apparatus to a desired wave band and having an off position, and means to move said dial plate through said slot progressively from a position thereof within said cabinet portion to positions thereof outside of said cabinet portion to successively position said scales adjacent to said indexing member comprising a dial plate actuating member coupled to said wave band switching means and to said dial plate.

3. Electrical apparatus tunable through a plurality of wave bands, comprising a cabinet portion provided with a slot, a dial plate having a plurality of scales arranged in horizontal relationship one above the other and each indicating one of said wave bands, a pointer member protruding from said slot for scanning said scales in a horizontal direction, an indexing member arranged in fixed relationship to said slot, said indexing member comprising a light source laterally illuminating said dial plate at a given distance from the outside of said cabinet portion, wave band switching means for adjusting said apparatus to a desired wave band, and means to progressively move said dial plate through said slot to thereby successively position said scales within the illuminating area of said source comprising a dial plate actuating member coupled to said wave band switching means and to said dial plate.

4. Electrical apparatus tunable through a plurality of wave bands, comprising a cabinet portion provided with a slot, a dial plate having a plurality of scales arranged in horizontal relationship one above the other and each indicating one of said wave bands, said dial plate being provided with light retaining means for limiting impinging lateral illumination to a given one of said scales, a pointer member protruding from said slot for scanning said scales in a horizontal direction, an indexing member arranged in fixed relationship to said slot, said indexing member comprising first and second light souces arranged at opposite ends of said slot and first and second light concentrating elements coupled to said sources laterally illuminating said dial plate at a given distance from the outside of said cabinet portion, wave band switching means for adjusting said apparatus to a desired wave band, and means to progressively move said dial plate through said slot to thereby successively position said scales adjacent to said light concentrating member comprising a dial plate actuating member coupled to said wave band switching means and to said dial plate.

5. Electrical apparatus tunable through a plurality of wave bands, comprising a cabinet portion provided with a slot, a dial plate having a plurality of scales arranged in horizontal relationship one above the other and each indicating one of said wave bands, said dial plate being provided with a horizontal groove intermediate to two of said scales for limiting impinging lateral illumination to a given one of said scales, a pointer member protruding from said slot for scanning said scales in a horizontal direction, an indexing member arranged in fixed relationship to said slot, said indexing member comprising first and second light sources arranged at opposite ends of said slot, tubular means enclosing said light sources and each provided with a peripheral guide-groove for said dial plate and first and second light concentrating elements coupled to said sources laterally illuminating said dial plate at a given distance from the outside of said cabinet portion, wave band switching means for adjusting said apparatus to a desired wave band, and means to progressively move said dial plate through said slot to thereby successively position said scales adjacent to said light concentrating members comprising a dial plate actuating member coupled to said wave band switching means and to said dial plate, said dial plate being removably secured to the said moving means.

MAX LEEUWIN.
JOHANNES CHRISTOFFEL ANTONIE RECOURT.

REFERENCES CITED

The following references are of record in the file of this patent:

UNITED STATES PATENTS

| Number | Name | Date |
|---|---|---|
| 2,193,107 | Maris | Mar. 12, 1940 |
| 2,261,386 | Keblusek et al. | Nov. 4, 1941 |
| 2,367,577 | Hayward | Jan. 16, 1945 |

FOREIGN PATENTS

| Number | Country | Date |
|---|---|---|
| 444,329 | Great Britain | Mar. 19, 1936 |
| 340,708 | Italy | May 26, 1936 |
| 149,480 | Austria | Mar. 10, 1937 |